(12) United States Patent
Ebert

(10) Patent No.: US 7,443,173 B2
(45) Date of Patent: Oct. 28, 2008

(54) SYSTEMS AND TECHNIQUES FOR RADIO FREQUENCY NOISE CANCELLATION

(75) Inventor: Gregory L. Ebert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/455,428

(22) Filed: Jun. 19, 2006

(65) Prior Publication Data

US 2008/0012575 A1    Jan. 17, 2008

(51) Int. Cl.
  G01R 29/26  (2006.01)
  G01R 23/20  (2006.01)
  H04B 1/00   (2006.01)
(52) U.S. Cl. .................. 324/613; 324/620; 455/63.1
(58) Field of Classification Search ............... None
  See application file for complete search history.

(56) References Cited

U.S. PATENT DOCUMENTS

| | | | | |
|---|---|---|---|---|
| 4,195,360 A * | 3/1980 | Fothergill | .................. | 367/136 |
| 5,448,244 A * | 9/1995 | Komatsu et al. | ............ | 342/155 |
| 5,490,231 A * | 2/1996 | Kane et al. | .................. | 704/226 |
| 5,682,360 A * | 10/1997 | Oshima | .................... | 369/13.2 |
| 6,529,000 B2 * | 3/2003 | Lou | ........................... | 324/309 |
| 6,606,001 B1 * | 8/2003 | Ziazadeh et al. | ............ | 330/288 |
| 6,882,312 B1 * | 4/2005 | Vorobiev et al. | ............ | 342/374 |
| 7,379,445 B2 * | 5/2008 | Guo et al. | .................... | 370/343 |
| 2003/0210093 A1 * | 11/2003 | Zhang | ........................ | 330/149 |
| 2004/0192243 A1 * | 9/2004 | Siegel | ........................ | 455/296 |

* cited by examiner

*Primary Examiner*—Diego Gutierrez
*Assistant Examiner*—Jeff Natalini
(74) *Attorney, Agent, or Firm*—Kacvinsky LLC

(57) ABSTRACT

Various embodiments for radio frequency (RF) noise cancellation are described. In one embodiment, an apparatus may comprise an RF noise cancellation system arranged to sense platform noise observed by a radio subsystem, create an inverse version of the sensed platform noise, and add the inverse version of the sensed platform noise to a received RF signal to remove the platform noise from the received RF signal. Other embodiments are described and claimed.

17 Claims, 3 Drawing Sheets

SYSTEMS AND TECHNIQUES FOR RADIO FREQUENCY NOISE CANCELLATION

BACKGROUND

Platform or system noise may adversely impact the ability of a device to receive radio frequency (RF) signals. In particular, platform noise may interfere with an incoming RF signal and may couple with signals in the receive path of the wireless device resulting in performance degradation. In many cases, platform noise may be perceived by the wireless device as random broadband noise making it difficult to mitigate.

To minimize the impact of platform noise, layout techniques may be employed when designing the wireless device to separate sources of noise from components sensitive to such noise. In some cases, RF shielding techniques may be employed within the wireless device to shield certain components of a radio subsystem from each other to prevent platform noise from coupling in the receive path. Such techniques for addressing platform noise, however, do not involve RF noise cancellation to mitigate platform noise.

DETAILED DESCRIPTION

Various embodiments are directed to systems and techniques for RF noise cancellation. In one embodiment, for example, an apparatus may comprise an RF noise cancellation system arranged to sense platform noise observed by a radio subsystem, create an inverse version of the sensed platform noise, and add the inverse version of the sensed platform noise to a received RF signal to remove the platform noise from the received RF signal. In various implementations, the RF noise cancellation system may create an inverse version of the sensed platform noise by recreating the platform noise sensed by the radio subsystem and generating a noise mitigating signal inverse to the recreated platform noise.

In various embodiments, the RF noise cancellation system may be arranged to sense the platform noise using a noise sensing antenna array having a plurality of antenna segments separated by a predetermined phase shift. The antenna segments may be arranged to generate phase shifted signals corresponding to the sensed platform noise which may be weighted and summed to recreate the sensed platform noise having an arbitrary phase shift and amplitude.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Figure 1:
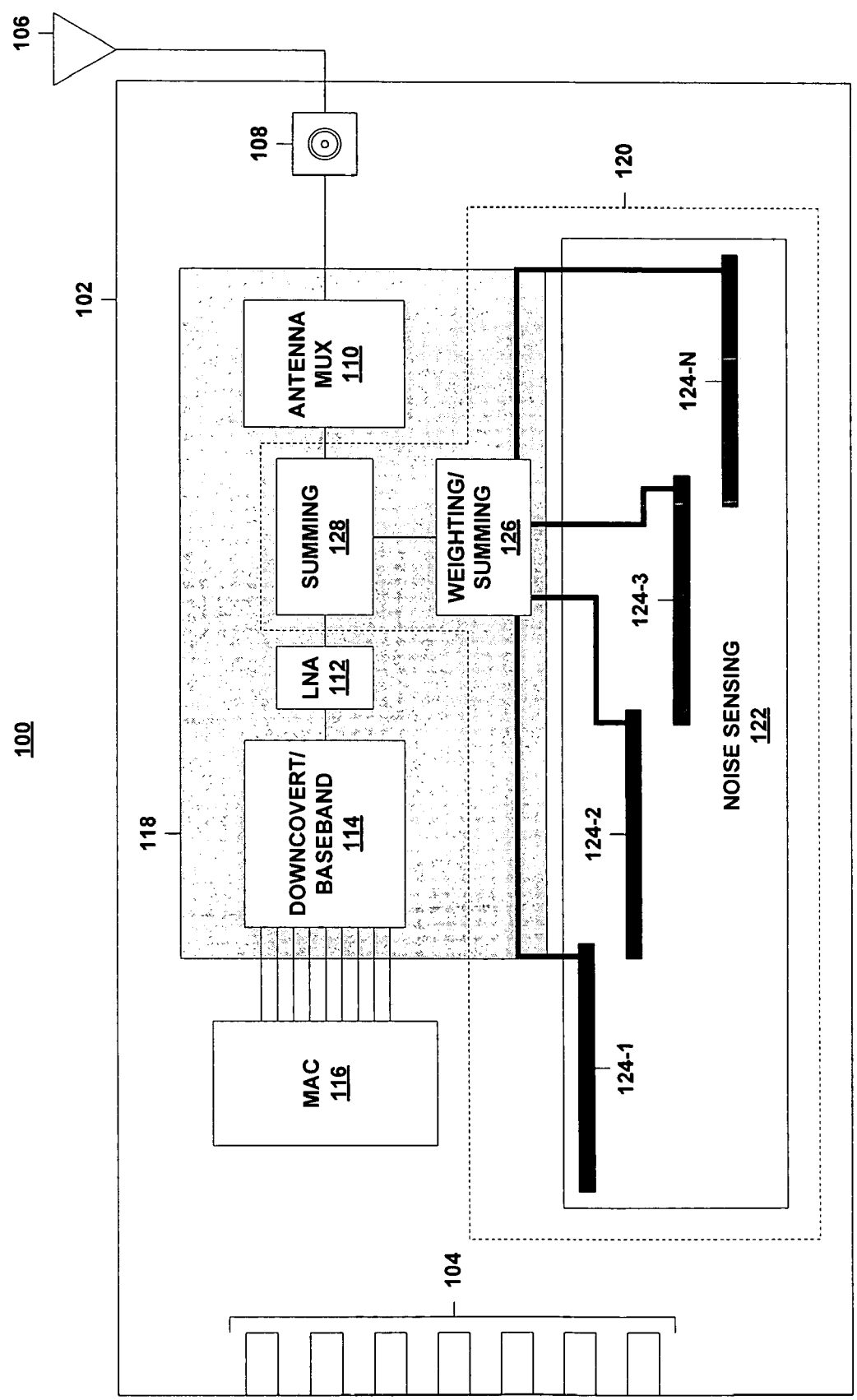
FIG. 1 illustrates one embodiment of a radio subsystem comprising an RF noise cancellation system.

FIG. 1 illustrates a block diagram of one embodiment of a radio subsystem 100. In general, the radio subsystem 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

The radio subsystem 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or provide instructions for processing the media information in a certain manner. The media and control information may be communicated from and to a number of different devices or networks.

In various implementations, the media information and control information may be segmented into a series of packets. Each packet may comprise, for example, a discrete data set having a fixed or varying size represented in terms of bits or bytes. It can be appreciated that the described embodiments are applicable to any type of communication content or format, such as packets, frames, fragments, cells, windows, units, and so forth.

The radio subsystem 100 may communicate, manage, or process information in accordance with one or more protocols. In various embodiments, for example, the radio subsystem 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

In various embodiments, the radio subsystem 100 may be arranged to communicate information over one or more types of wireless communication links. Examples of a wireless communication link may include, without limitation, a radio channel, infrared channel, RF channel, Wireless Fidelity (WiFi) channel, a portion of the RF spectrum, and/or one or more licensed or license-free frequency bands. The radio subsystem 100 also may be arranged to communicate information over one or more types of wired communication links. Examples of a wired communication link, may include, without limitation, a wire, cable, bus, Universal Serial Bus (USB), printed circuit board (PCB), Ethernet connection, peer-to-peer (P2P) connection, backplane, switch fabric, semiconductor material, twisted-pair wire, co-axial cable, fiber optic connection, and so forth.

In various embodiments, the radio subsystem 100 may be implemented as a wireless device. Examples of wireless devices may include, without limitation, a wireless card, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smart phone, pager, messaging device, media player, digital music player, set-top box (STB), appliance, subscriber station, workstation, user terminal, mobile unit, and so forth. In such embodiments, the wireless device may comprise one more wireless interfaces and/or components for wireless communication such as one or more transmitters, receivers, transceivers, chipsets, amplifiers, filters, control logic, network interface cards (NICs), antennas, and so forth.

The radio subsystem 100 may employ one or more modulation techniques including, for example: frequency hopping spread spectrum (FHSS) modulation, direct sequence spread spectrum (DSSS) modulation, orthogonal frequency division multiplexing (OFDM) modulation, Binary Phase Shift Keying (BPSK) modulation, Complementary Code Keying (CCK) modulation, Quadrature Phase Shift Keying (QPSK) modulation, Offset QPSK (OQPSK) modulation, Differential QPSK (DQPSK), Quadrature Amplitude Modulation (QAM), N-state QAM (N-QAM), Differential QAM (DQAM), Frequency Shift Keying (FSK) modulation, Minimum Shift Keying (MSK) modulation, Gaussian MSK (GMSK) modulation, and so forth.

The radio subsystem 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the communications system 100 may communicate information according to one or more IEEE 802 standards including IEEE 802.11 standards for wireless local area networks (WLANS) such as the IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and extensions thereto (e.g., 802.11a, b, g/h, j, n, and variants). The embodiments are not limited in this context.

In one embodiment, the radio subsystem 100 may be implemented as a wireless device such as an 802.11 a/b/g wireless card, for example. In such an embodiment, the wireless card may provide tri-mode WLAN support for communication in accordance with the IEEE 802.11a, 802.11b, and/or 802.11g extensions to the IEEE 802.11 standard. The IEEE 802.11a extension utilizes OFDM and provides data transfer rates up to 54 Megabits per second (Mbps) in the 5 Gigahertz (GHz) frequency band. The IEEE 802.11b extension utilizes BPSK, QPSK, and CCK and provides data transfer rates up to 11 Mbps, with a fallback to 5.5, 2 and 1 Mbps, in the 2.4 GHz band. The IEEE 802.11g extension utilizes OFDM modulation and provides data transfer rates up to 54 Mbps in the 2.4 GHz frequency band and backwards capability with 802.11b networks. The embodiments are not limited in this context.

As depicted in the embodiment of FIG. 1, the radio subsystem 100 may be illustrated and described as comprising several separate functional components and/or modules. In various implementations, the components and/or modules may be connected and/or logically coupled by one or more communications media such as, for example, wired communication media, wireless communication media, or a combination of both, as desired for a given implementation. Although various embodiments may be described in terms of components and/or modules to facilitate description, it is to be appreciated that such components and/or modules may be implemented by one or more hardware components, software components, and/or combination thereof.

The radio subsystem 100 may comprise a PCB 102. The PCB 102 may include, for example, conductive traces, via structures, and/or one or more laminates fabricated by processes such as etching, bonding, drilling, and plating. In some embodiments, the PCB 102 may comprise a flexible material, such as a flexible printed circuit (FPC). As shown, the PCB 102 may comprise edge connectors 104 for connecting to a computer or host device, for example.

The radio subsystem 100 may comprise a communications antenna 106 coupled to the PCB 102 through an RF connector 108. In various embodiments, the communications antenna 106 may be arranged to receive RF signals over a wireless communication link. The communications antenna 106 may comprise, for example, one or more internal and/or external antennas. Examples of an antenna may include, without limitation, an omni-directional antenna, a monopole antenna, a dipole antenna, an end fed antenna, a circularly polarized antenna, a microstrip antenna, a diversity antenna, a dual antenna, an antenna array, and so forth. Although the communications antenna 106 is shown as a single antenna for purposes of illustration, multiple antennas may be employed for a given implementation.

As shown, the communications antenna 106 may be coupled through the RF connector 108 and to an antenna multiplexer 110. In various implementations, the radio subsystem 100 may comprise or form part of a wireless device capable of both transmitting and receiving RF signals through the communications antenna 106. In such implementations, the antenna multiplexer 110 may be arranged to switch between a transmit (TX) path and a receive (RX) path within the wireless device depending on the mode of operation. The TX path may include various components for transmitting RF signals such as a power amplifier, upconverter, and so forth. In various embodiments, the radio subsystem 100 may be implemented in the RX path of a wireless device such as an 802.11 a/b/g wireless card, for example. The RX path may comprise, for example, a duel-band RX chain to support reception at multiple frequency bands (e.g., 2.4 GHz and 5 GHz).

The radio subsystem 100 may comprise a low noise amplifier (LNA) module 112. In various embodiments, the LNA module 112 may be arranged to amplify a received RF signal. The LNA module 112 may comprise, for example, one more LNAs implemented by gallium arsenide (GaAs) heterojunction bipolar transistors (HBTs). In some embodiments, multiple LNAs may be implemented to support duel-band (e.g., 2.4 GHz and 5 GHz) reception.

The radio subsystem 100 may comprise a downconvert/baseband module 114. In various embodiments, the downconvert/baseband module 114 may be arranged to receive an RF signal from the LNA module 112 and to downconvert the RF signal to baseband signals such as in-phase and quadrature (I/Q) signals. In one embodiment, the downconvert/baseband module 114 may be implemented as an RF integrated circuit (RFIC) chip and may comprise various components including, for example, a mixer, frequency synthesizer, automatic gain control (AGC), and/or active filters to provide out-of-band signal rejection. The embodiments are not limited in this context.

The radio subsystem 100 may comprise a media access control (MAC) module 116. In various embodiments, the MAC module 116 may be arranged to receive and process the baseband signals from the downconvert/baseband module 114. In one embodiment, the MAC module 116 may be implemented as a MAC chip and may comprise various digital and mixed signal components including, for example, an analog-to-digital converter (ADC), a digital-to analog-converter (DAC), a MAC processor, and/or a modem (e.g., OFDM and CCK modem). The embodiments are not limited in this context.

In various embodiments, the MAC module 116 may comprise a host or platform interface such as a Peripheral Component Interconnect (PCI) interface, PCI Express (PCIe) interface, USB interface, CardBus interface, and so forth. In some embodiments, the MAC module 116 may comprise an associated volatile or nonvolatile memory such as an electrically erasable programmable read-only memory (EEPROM) to store various PCB related information (e.g., MAC address, calibration data). In various implementations, the MAC module 116 may be arranged to perform various operations such as error-correction, error-recovery, signal detection, AGC, frequency-offset estimation, symbol timing, channel estimation, active filtering, baseband processing, and security operations (e.g., authentication, encryption/decryption). The embodiments are not limited in this context.

In various embodiments, the radio subsystem 100 may comprise or be implemented by one or more chips or integrated circuits (ICs). In one embodiment, for example, the downconvert/baseband module 114 and the MAC 116 module may be implemented by separate ICs (e.g., an RFIC chip and a MAC chip), and the communications antenna 106, antenna multiplexer 110, and LNA module 112 may comprise or form part of the RF front end architecture of the radio subsystem 100. The embodiments are not limited in this context.

The radio subsystem 100 may comprise an RF shield 118. In various embodiments, the RF shield 118 may be arranged to surround and isolate certain components of the radio subsystem 100 to prevent platform noise from coupling in the RX path. The RF shield 118 may be mounted to the PCB 102 and/or may be incorporated into packaging that surrounds the electronic components.

As shown, the radio subsystem 100 may comprise an RF noise cancellation system 120. In various embodiments, the RF noise cancellation system 120 may be incorporated into the radio subsystem 100 to provide an awareness of system or platform noise generated by the environment around the radio subsystem 100. The RF noise cancellation system 120 may be arranged to sense and then mitigate and/or cancel the system or platform noise. In various implementations, the RF noise cancellation system 120 may be arranged to prevent system or platform noise from interfering with the operation of a wireless communication device such as an 802.11 a/b/g wireless card, for example.

The system or platform noise sensed by the RF noise cancellation system 120 may be generated by various noise sources present in the environment of the radio subsystem 100. In various embodiments, the RF noise cancellation system 120 may excited by a noise source that excites various components of the radio subsystem 100 such as, for example, the communications antenna 106 used to receive RF signals. The sources of system or platform noise may be internal and/or external to the radio subsystem 100. In some cases, the platform noise source may be located external to the PCB 102 of the radio subsystem 100. The platform noise source may be present, for example, in a radio system, computer, host device, and/or package that incorporates the radio subsystem 100. In other cases, the platform noise may be radiated from one or more components of the radio subsystem 100.

In various embodiments, the RF noise cancellation system 120 may be implemented in the RX path of the radio subsystem 100. As shown in FIG. 1, for example, the RF noise cancellation system 120 may be implemented before the LNA module 112 and/or the downconvert/baseband module 114 in the RX path of the radio subsystem 100. In various implementations, the RF noise cancellation system 120 may be arranged to perform noise cancellation at RF. In such implementations, the noise cancellation is performed prior to downconverting the RF signal to baseband. The embodiments are not limited in this context.

The system or platform noise may be sensed or perceived by the radio subsystem 100 as random broadband noise. Such random broadband noise may adversely impact the power level sensitivity of the radio subsystem 100 to receive RF signals. As such, reducing such random platform noise may enhance the signal-to-noise ratio (SNR) of the radio subsystem 100.

In various embodiments, the radio subsystem 100 may comprise an RF front end arranged to filter broadband noise through a narrowband filter, for example. In such embodiments, the RF front end may be arranged to pass only a particular band of interest. Since for most radios the channel bandwidth may be relatively small compared to the center frequency, when a broadband signal is passed through a narrowband filter, the resulting narrowband version of the platform noise passed at the band of interest may comprise a sinusoid at the radio center frequency of the narrowband filter. Due to the random nature of the broadband noise, the resulting version of platform noise may be a sinusoid at the radio center frequency having random amplitude and phase. By treating or approximating the platform noise as a sinusoid at the radio center frequency with random phase and amplitude, the RF noise cancellation system 120 may be arranged to mitigate and/or cancel the platform noise.

In various embodiments, the RF noise cancellation system 120 may be arranged to mitigate and/or cancel platform noise by sensing the platform noise observed by the radio subsystem 100, creating an inverse version of the sensed platform noise, and then adding the inverse version of the sensed platform noise to a received RF signal to remove the platform noise from the received RF signal. In various implementations, the RF noise cancellation system 120 may be arranged to create an inverse version of the sensed platform noise by recreating platform noise sensed by the radio subsystem 100 and generating a noise mitigating signal inverse to the recreated platform noise. In such implementations, the noise mitigating signal may be added to an RF signal received by the radio subsystem 100 to mitigate and/or cancel the platform noise.

In various implementations, the RF noise cancellation system 120 may be arranged to sense platform noise observed by the radio subsystem 100 and/or create the inverse version of the sensed platform noise at a time when the radio subsystem 100 is not in use and/or is not receiving RF signals. In such implementations, the RF noise cancellation system 120 may be trained during a time when external platform noise can be isolated so that the platform noise can be precisely sensed and/or an accurate inverse version of the sensed platform noise may be obtained. Such training may improve the ability of the RF noise cancellation system 120 to completely cancel or minimize any noise observed by the components of the radio subsystem 100, such as the communications antenna 106. The embodiments are not limited in this context.

As shown in the embodiment of FIG. 1, the RF noise cancellation system 120 may comprise a noise sensing module 122. In such an embodiment, the noise sensing module 122 may be arranged to sense platform noise perceived by the radio subsystem 100. In various implementations, the noise sensing module 122 may be embedded in the PCB 102 in close proximity to one or more components in the RX path of the radio subsystem 100. Accordingly, the noise sensing module 122 may be arranged to sense platform noise that may interfere with various components of the radio subsystem 100. In one embodiment, for example, the noise sensing module 122 may be arranged to sense the platform noise observed by the communications antenna 106 of the radio subsystem 100.

In various embodiments, the noise sensing module 122 may be resonant at a particular frequency of interest. The resonant frequency of the noise sensing module 122 may comprise, for example, the radio center frequency of a particular radio band or RF channel. In one embodiment, the RF noise cancellation system 120 may be implemented within a wireless device such as an 802.11 a/b/g wireless card. In such an embodiment, the resonant frequency of the noise sensing module 122 may be tuned to the radio center frequency of 5 GHz for IEEE 802.11a communication and may be tuned to the radio center frequency of 2.4 GHz for IEEE 802.11b and/or 802.11g communication.

In various implementations, the noise sensing module 122 may be arranged to sense the narrowband version of the platform noise at a particular resonant frequency. In some embodiments, the noise sensing module 122 may be implemented using narrowband antennas or sensors arranged to sense the narrowband version of the platform noise at the particular resonant frequency. It is noted that even in the absence of extremely narrowband filters, the noise sensing module 122 may be arranged to cancel noise for a specific frequency. For example, by approximating the filtered version of broadband platform noise as a sinusoid, the platform noise may be canceled at the frequency for which the noise sensing module 122 is resonant or optimized.

As shown, the noise sensing module 122 may be implemented as antenna array arranged to sense platform noise. In various embodiments, the antenna array may comprise a plurality of antenna segments 124-1-N, where N may represent any positive integer value limited only by the physical capacity of the radio subsystem 100. In various implementations, each of the antenna segments 124-1-N may comprise a microstrip antenna arranged to sense platform noise.

In one embodiment, for example, the platform noise may be sensed using an antenna array comprising a series of four microstrip antennas. In such an embodiment, the four microstrip antennas may implemented as open quarter-wave sections of a transmission line tuned to the center frequency of a particular radio band. The embodiments are not limited in this context.

In various embodiments, each of the antenna segments 124-1-N of the antenna array may be separated by a predetermined phase shift. In some embodiments, each of the antenna segments 124-1-N may separated by an equal phase shift. In one embodiment, for example, the platform noise may be sensed using an antenna array comprising a series of four microstrip antennas, each spaced apart by a phase shift of 90° or quarter wavelength at radio center frequency. The embodiments are not limited in this context.

When separated by a predetermined phase shift, the antenna segments 124-1-N may be arranged to generate phases shifted signals or vectors corresponding to platform noise sensed by the noise sensing module 122 and/or various components of the radio subsystem 100, such as the communications antenna 106. In one embodiment, for example, the antenna segments 124-1-N may comprise four microstrip antennas that generate four phase shifted signals, each with a 90° phase shift relative to each other. The embodiments are not limited in this context.

As shown in the embodiment of FIG. 1, the RF noise cancellation system 120 may comprise a weighting/summing module 126. In such an embodiment, the weighting/summing module 126 may be arranged to receive the phase shifted signals from the antenna segments 124-1-N and to recreate the platform noise sensed by the noise sensing module 122. In various implementations, the weighting/summing module 126 may be arranged to recreate the sensed platform noise with arbitrary phase and amplitude for a narrow frequency band around the radio center frequency.

In various embodiments, the weighting/summing module 126 may be arranged to recreate the sensed platform noise by weighting the phase shifted signals received from the antenna segments 124-1-N and then summing the weighted phase shifted signals. The phases shifted signals may comprise, for example, the phase shifted versions of the narrowband filtered platform noise.

The weighting/summing module 126 may be arranged to weight the phase shifted signals by multiplying each of the phase shifted signals or vectors by a particular scaling factor, for example. In various implementations, the weighting/summing module 126 may be arranged to add the phase shifted signals from the antenna segments 124-1-N with variable weighting on each phase shifted signal. The weighting/summing module 126 may be arranged to sum the weighted phase shifted signals or vectors using vector summation, for example. By weighting and then summing the phase shifted signals, the weighting/summing module 126 may obtain a signal having an arbitrary phase shift and arbitrary amplitude. For example, the weighting/summing module 126 may weight and then sum the phase shifted signals to determine a point corresponding to a target or arbitrary amplitude and phase.

In one embodiment, the antenna segments 124-1-N may comprise four microstrip antennas arranged to generate 90° phase shifted signals. In such an embodiment, the weighting/summing module 126 may multiply each of the 90° phase shifted signals by a particular scaling factor and then add the weighted phase shifted signals to construct a signal having an arbitrary phase shift between 0° and 360°. In various implementations, the weighting/summing module 126 may be arranged to add the phase shifted signals from the four microstrip antennas with variable weighting on each phase shifted signal. The weighting/summing module 126 may be arranged to add gain, if necessary, to scale the vectors sum to a particular target or arbitrary amplitude.

In various implementations, the weighting of the antenna segments 124-1-N (e.g., four microstrip antennas) may be intermittently optimized to account for fluctuations in the characteristics of the platform noise. In such implementations, an algorithm or logic may be employed to calibrate the optimum phase shift and optimum amplitude scaling. As the amplitude and the phase of the narrowband platform noise changes randomly, the output of the weighted array of antenna segments 124-1-N may shift and scale the random amplitude and phase.

The weighting/summing module 126 may be arranged to generate and output an inverse version of the platform noise sensed by the noise sensing module 122. In various environments, the weighting/summing module 126 may be arranged to create an inverse version of the sensed platform noise by generating a noise mitigating signal inverse to the recreated platform noise. The noise mitigating signal may comprise, for example, a signal inverse to the platform noise in the radio band. In such embodiments, the noise mitigating signal may be added to an RF signal received by the radio subsystem 100 to mitigate and/or cancel the platform noise.

As shown in the embodiment of FIG. 1, the RF noise cancellation system 120 may comprise a summing module 128. In such an embodiment, the summing module 128 may be arranged to receive the noise mitigating signal from the weighting/summing module 126 and then add the noise mitigating signal to an RF signal received by the radio subsystem 100. In one embodiment, for example, the summing module 128 may be arranged to add the noise mitigating signal to an RF signal received by the communications antennas 106 to cancel and/or nullify the noise received at the RF input of the radio subsystem 100.

In various implementations, the described embodiments may provide a high level of interoperability, even in noisy platform environments, resulting in improved performance and increased user satisfaction. In some cases, the described embodiments may provide cost reduction by reducing material expenses of the radio subsystem 100. For example, by reducing platform noise, the radio subsystem 100 may comprise a PCB 102 having fewer layers (e.g., 4 layers rather than 10 layers). The embodiments are not limited in this context.

Although FIG. 1 may illustrate the RF noise cancellation system 120 as comprising separate modules (e.g., weighting/summing module 126 and summing module 128), each performing various operations, it can be appreciated that the embodiments are not limited in this context. For example, in some embodiments, the various operations performed by the weighting/summing module 126 and the summing module 128 may be combined and/or separated for a given implementation and may be performed by a greater or fewer number of modules. Furthermore, in some embodiments, various operations performed by the RF noise cancellation system 120 may be performed by one or more components of the radio subsystem 100, such as the downconvert/baseband module 114, for example.

Figure 2:
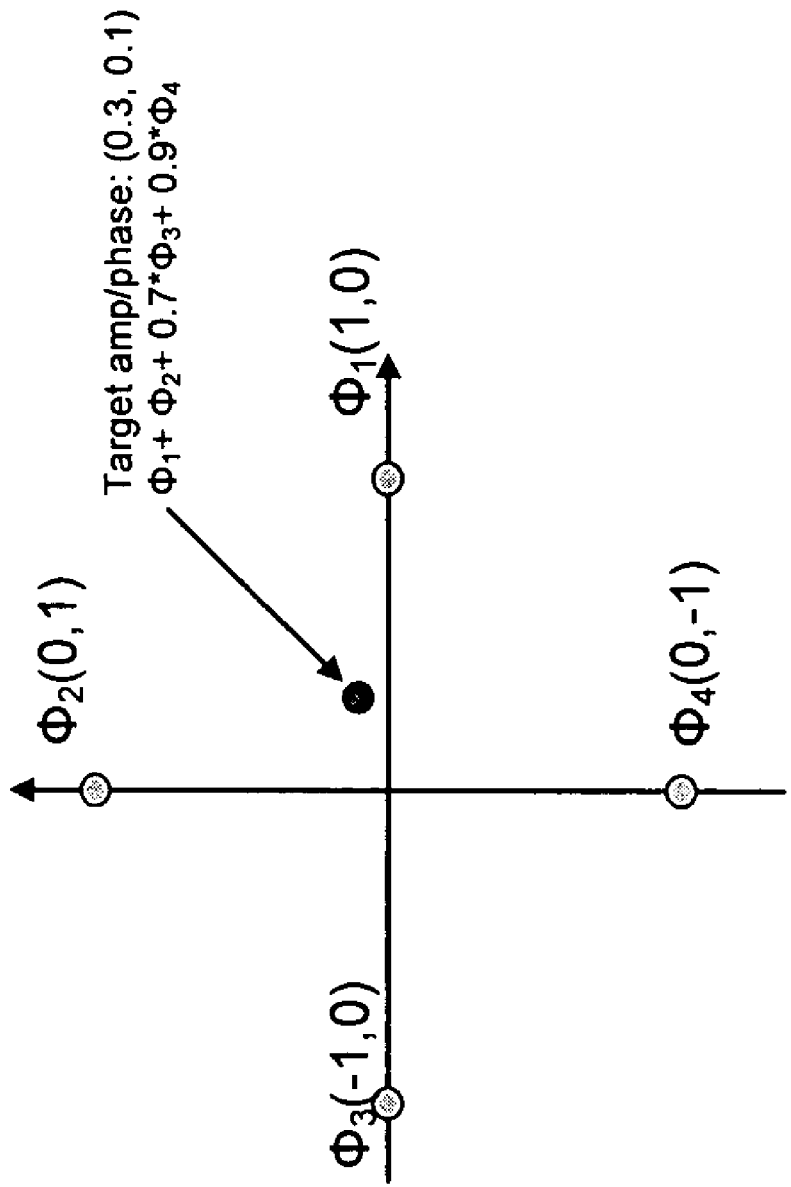
FIG. 2 illustrates a graphical representation of one embodiment of adding weighted phase shifted noise signals.

FIG. 2 illustrates a graphical representation 200 of one embodiment of adding weighted phase shifted noise signals. In various embodiments, the adding of weighted phase shifted noise signals may be performed by various systems, components, and/or modules and may be implemented as hardware, software, and/or any combination thereof, as desired for a given set of design parameters or performance constraints. For example, the adding of weighted phase shifted noise signals may be performed by a logic device and/or logic comprising instructions, data, and/or code to be executed by a logic device. For purposes of illustration, and not limitation, the graphical representation 200 is described with reference to FIG. 1. The embodiments are not limited in this context.

As shown in the embodiment of FIG. 2, the graphical representation 200 depicts four phase shifted noise signals represented as $\Phi_1$, $\Phi_2$, $\Phi_3$, and $\Phi_4$. In this embodiment, each of the phase shifted noise signals $\Phi_1$, $\Phi_2$, $\Phi_3$, and $\Phi_4$ are separated by a 90° phase shift relative to each other. Signal $\Phi_1$ is 90° phase shifted from signal $\Phi_2$, which is 90° phase shifted from signal $\Phi_3$, which is 90° phase shifted from $\Phi_4$, which is 90° phase shifted from signal $\Phi_1$.

In this embodiment, the four phase shifted noise signals $\Phi_1$, $\Phi_2$, $\Phi_3$, and $\Phi_4$ may be generated by an RF noise cancellation system 120 employing a noise sensing array comprising four microstrip antennas spaced apart by a 90° phase shift. The four phase shifted noise signals $\Phi_1$, $\Phi_2$, $\Phi_3$, and $\Phi_4$ may be provided to a weighting/summing module 126 arranged to determine a signal having an arbitrary phase shift and arbitrary amplitude.

In this embodiment, the weighting/summing module 126 may be arranged to multiply each of the 90° phase shifted signals $\Phi_1$, $\Phi_2$, $\Phi_3$, and $\Phi_4$ by a particular scaling factor (e.g., $S_1$, $S_2$, $S_3$, and $S_4$). The weighting/summing module 126 may then add the weighted phase shifted signals (e.g., $S_1\Phi_1+S_2\Phi_2+S_3\Phi_3+S_4\Phi_4$) to construct a signal or point having a target arbitrary phase shift between 0° and 360°. In various implementations, the weighting/summing module 126 may be arranged to add the phase shifted signals $\Phi_1$, $\Phi_2$, $\Phi_3$, and $\Phi_4$ with variable weighting on each phase shifted signal.

As shown, the graphical representation 200 comprises a point (0.3, 0.1) having a target amplitude and phase. In this case, scaling factors may be multiplied with the phase shifted signals $\Phi_1$, $\Phi_2$, $\Phi_3$, and $\Phi_4$, where $S_1$=no scaling, $S_2$=no scaling, $S_3$=0.7 scaling, and $S_4$=0.9 scaling. When the weighted phase shifted signals are added according to the vector summation $\Phi_1+\Phi_2+0.7*\Phi_3+0.9*\Phi_4$, the vector sum is the point (0.3, 0.1) in the upper right quadrant having the target amplitude and phase.

If necessary, gain may be added to scale the vectors sum to a particular target or arbitrary and amplitude. For example, if the amplitude is something less than the original or desired amplitude, gain can be added after the weighting/summing operation. It can be appreciated that a point corresponding to an arbitrary target amplitude and phase may be placed anywhere within a plane drawn through the points corresponding to the phase shifted signals $\Phi_1$, $\Phi_2$, $\Phi_3$, and $\Phi_4$ by appropriately weighting, summing, and/or scaling the vectors.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 3:
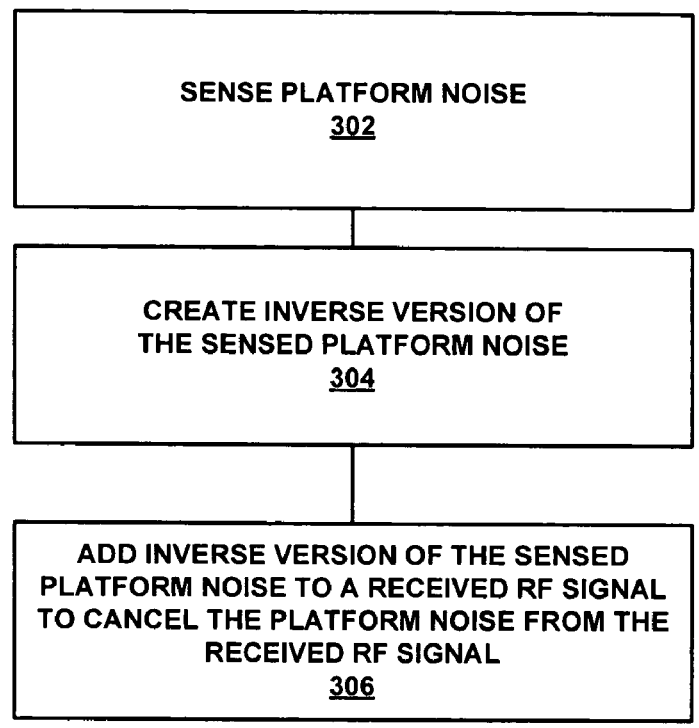
FIG. 3 illustrates one embodiment of a logic flow for RF noise cancellation.

FIG. 3 illustrates one embodiment of a logic flow 300 for RF cancellation. In various embodiments, the logic flow 300 may be performed by various systems, components, and/or modules and may be implemented as hardware, software, and/or any combination thereof, as desired for a given set of design parameters or performance constraints. For example, the logic flow 300 may be implemented by a logic device and/or logic comprising instructions, data, and/or code to be executed by a logic device. For purposes of illustration, and not limitation, the logic flow 300 is described with reference to FIG. 1. The embodiments are not limited in this context.

The logic flow 300 may comprise sensing platform noise (block 302). In various embodiments, platform noise observed by a radio subsystem 100 may be sensed by an RF noise cancellation system 120. In various implementations, the RF noise cancellation system 120 may be arranged to sense the platform noise using a phased noise sensing antenna array having a plurality of antenna segments 124-1-N separated by a predetermined phase shift. The antenna segments 124-1-N may be arranged to generate phase shifted signals corresponding to the sensed platform noise, such as a narrow band of version of the platform noise.

The logic flow 300 may comprise creating an inverse version of the sensed platform noise (block 304). In various embodiments, the RF noise cancellation system 120 may create an inverse version of the sensed platform noise by recreating the platform noise sensed by the radio subsystem 100 and by generating a noise mitigating signal inverse to the recreated platform noise. In various implementations, phase shifted signals corresponding to the sensed platform noise may be weighted, summed, and/or scaled to recreate the sensed platform noise having an arbitrary phase shift and amplitude.

In some embodiments, variable weighting may be applied to each phase shifted signal, and the weighted phase shifted signals or vectors may be summed using vector summation, for example. By weighting and then summing the phase shifted signals, a signal having an arbitrary phase shift and arbitrary amplitude may be obtained. For example, the phase shifted signals may be weighted and summed to determine a point corresponding to a target or arbitrary amplitude and phase. If necessary, gain may be added to scale the vectors sum to a particular target or arbitrary and amplitude.

In some implementations, the weighting of the phase shifted signals may be intermittently optimized to account for fluctuations in the characteristics of the platform noise. In such implementations, logic may be employed to calibrate the optimum phase shift and optimum amplitude scaling. As the amplitude and the phase of the narrowband platform noise changes randomly, the output of the phased antenna array may shift and scale the random amplitude and phase.

The logic flow 300 may comprise adding the inverse version of the sensed platform noise to a received RF signal to cancel the platform noise from the received RF signal (block 306). In various embodiments, the RF noise cancellation system 120 may be arranged to add the noise mitigating signal to an RF signal received by the communications antenna 106 to cancel and/or nullify the noise received at the RF input of the radio subsystem 100.

In various implementations, the RF noise cancellation system 120 may be arranged to sense platform noise observed by the radio subsystem 100 and/or create the inverse version of the sensed platform noise at a time when the radio subsystem 100 is not in use and/or is not receiving RF signals. In such implementations, the RF noise cancellation system 120 may be trained during a time when external platform noise can be isolated so that the platform noise can be precisely sensed and/or an accurate inverse version of the sensed platform noise may be obtained. The embodiments are not limited in this context.

Figure 4:
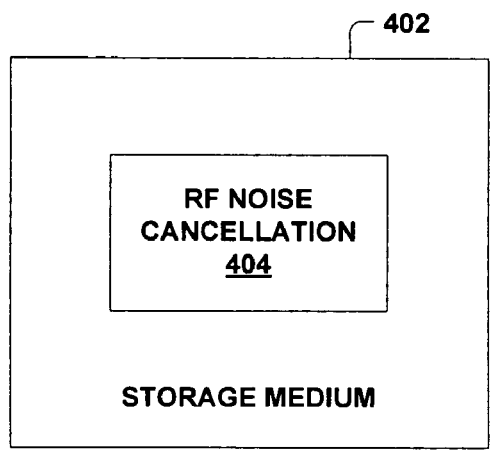
FIG. 4 illustrates one embodiment of an article of manufacture comprising RF noise cancellation logic.
Figure 1:
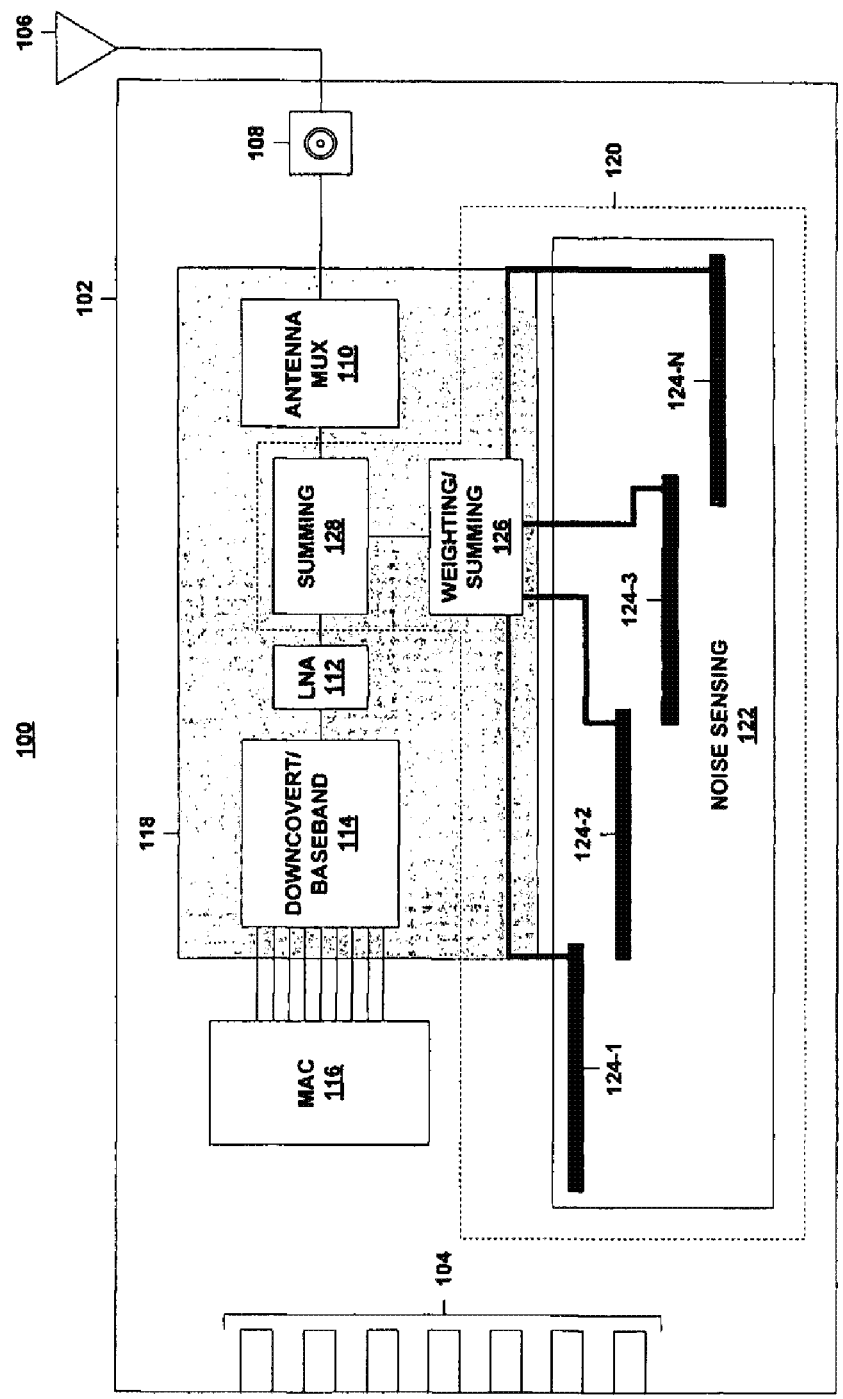

FIG. 4 illustrates one embodiment of an article of manufacture 400. As shown, the article 400 may comprise a storage medium 402 to store RF noise cancellation logic 404 for performing various operations in accordance with the described embodiments. In various embodiments, the article 400 may be implemented by various systems, components, and/or modules.

The article 400 and/or machine-readable storage medium 402 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 400 and/or machine-readable medium 402 may store RF noise cancellation logic 404 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The RF noise cancellation logic 404 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
 a radio frequency (RF) noise cancellation system to create an inverse version of platform noise sensed by a radio subsystem and to add the inverse version of the sensed platform noise to a received RF signal to remove platform noise from the received RF signal, the RF noise cancellation system comprising a weighting/summing module to recreate the platform noise sensed by the radio subsystem and to generate a noise mitigating signal inverse to the recreated platform noise, the recreated platform noise having arbitrary amplitude and phase, the weighting/summing module to variably weight and sum phase shifted noise signals corresponding to the platform noise sensed by the radio subsystem to determine the arbitrary amplitude and phase and a noise sensing module to sense platform noise observed by the radio subsystem and to generate phase shifted noise signals corresponding to platform noise sensed by the noise sensing module, the noise sensing module comprising an antenna array having a plurality of antenna segments separated by a predetermined phase shift.

2. The apparatus of claim 1, wherein one or more of the antenna segments comprises a microstrip antenna.

3. The apparatus of claim 1, wherein the noise sensing module is resonant at a particular frequency of interest.

4. The apparatus of claim 1, the platform noise comprising random broadband noise.

5. The apparatus of claim 1, the apparatus comprising a wireless card including the RF noise cancellation system and the radio subsystem.

6. A system comprising:
a wireless device comprising an RF noise cancellation system to create an inverse version of platform noise sensed by a radio subsystem and to add the inverse version of the sensed platform noise to a received RF signal to remove platform noise from the received RF signal;
a communications antenna coupled to the wireless device to receive the RF signal; and
a noise sensing module to sense platform noise observed by the radio subsystem and to generate phase shifted noise signals corresponding to platform noise sensed by the noise sensing module, the noise sensing module comprising an antenna array having a plurality of antenna segments separated by a predetermined phase shift,
the RF noise cancellation system comprising a weighting/summing module to recreate the platform noise sensed by the radio subsystem and to generate a noise mitigating signal inverse to the recreated platform noise, the recreated platform noise having arbitrary amplitude and phase, the weighting/summing module to variably weight and sum phase shifted noise signals corresponding to the platform noise sensed by the radio subsystem to determine the arbitrary amplitude and phase.

7. The system of claim 6, wherein one or more of the antenna segments comprises a microstrip antenna.

8. The system of claim 6, wherein the noise sensing module is resonant at a particular frequency of interest.

9. The system of claim 6, the platform noise comprising random broadband noise.

10. A method comprising:
sensing platform noise;
creating an inverse version of the sensed platform noise;
adding the inverse version of the sensed platform noise to a received RF signal to cancel the platform noise from the received RF signal;
weighting and summing phase shifted signals corresponding to the sensed platform noise to recreate the sensed platform noise having an arbitrary phase shift and amplitude; and
sensing the platform noise using a phased noise sensing antenna array having a plurality of antenna segments separated by a predetermined phase shift.

11. The method of claim 10, further comprising recreating the platform noise and generating a noise mitigating signal inverse to the recreated platform noise.

12. The method of claim 10, further comprising adding gain to scale the sum of the weighted phase shifted signals.

13. The method of claim 10, further comprising intermittently optimizing the weighting of the phase shifted signals to account for fluctuations in the platform noise.

14. The method of claim 10, wherein at least one of sensing platform noise and creating an inverse version of the sensed platform noise is performed at a time when RF signals are not being received.

15. An article comprising a machine-readable storage medium containing instructions that if executed enable a system to:
sense platform noise using a phased noise sensing antenna array having a plurality of antenna segments separated by a predetermined phase shift;
create an inverse version of the sensed platform noise;
add the inverse version of the sensed platform noise to a received RF signal to cancel the platform noise from the received RF signal; and
weight and sum phase shifted signals corresponding to the sensed platform noise to recreate the sensed platform noise having an arbitrary phase shift and amplitude.

16. The article of claim 15, further comprising instructions that if executed enable a system to recreate the platform noise and generate a noise mitigating signal inverse to the recreated platform noise.

17. The article of claim 15, further comprising instructions that if executed enable a system to add gain to scale the sum of the weighted phase shifted signals.

* * * * *

UNITED STATES PATENT AND TRADEMARK OFFICE
CERTIFICATE OF CORRECTION

PATENT NO. : 7,443,173 B2
APPLICATION NO. : 11/455428
DATED : October 28, 2008
INVENTOR(S) : Ebert It is certified that error appears in the above-identified patent and that said Letters Patent is hereby corrected as shown below:

On Sheet 1 of 3, in FIG. 1 (Reference Numeral 114), line 1, delete "DOWNCOVERT/" and insert -- DOWNCONVERT/ --, therefor.

Signed and Sealed this

Thirty-first Day of March, 2009

JOHN DOLL
*Acting Director of the United States Patent and Trademark Office*